June 21, 1949.  W. B. MOORE  2,473,964
HANDLE FOR COOKING UTENSILS
Filed Oct. 24, 1946

INVENTOR.
Walter B. Moore.
BY
ATTORNEYS

Patented June 21, 1949

2,473,964

UNITED STATES PATENT OFFICE 2,473,964

HANDLE FOR COOKING UTENSILS

Walter B. Moore, Coshocton, Ohio, assignor to The Moore Enameling & Manufacturing Company, West Lafayette, Ohio, a corporation of Ohio Application October 24, 1946, Serial No. 705,435

5 Claims. (Cl. 16—110)

My invention relates to a handle for cooking utensils. It has to do, more particularly, with a handle for metal cooking utensils and deals, more specifically, with that type of handle which includes a metal stub that is suitably attached to the body of the utensil. Although my invention is particularly applicable to enameled ware, it is not limited to such ware.

The most popular and widely sold type of porcelain enameled cooking utensils are made of light gauge steel for purposes of economy in production. It has been the practice, prior to my development, to spot weld, gas weld, rivet or otherwise attach the stub handle to the outer surface of the side wall of the metal body of the utensil. In attaching the inner end of the stub handle only to the body side wall, great difficulty has been encountered in obtaining a complete, strong and satisfactory joint. In many cases, the stub handles would break off or become detached from the side wall of the utensil body after a short period of use or after severe use. Furthermore, the body of the utensil being very thin, the pressure on the butt end of the stub handle, resulting during use of the utensil, had a tendency to indent or flex the wall of the body. When this occurred in porcelain enameled cooking utensils, the porcelain enamel, which is high quality glass, would chip off on the inside of the vessel.

One of the objects of my invention is to provide a handle structure for cooking utensils, the handle including a stub having its inner end attached to the body of the utensil in such a manner that a strong, rugged joint is formed so that there will be no danger of the stub separating from the body even after long continued and severe use of the utensil.

Another object of my invention is to provide a stub handle of the type indicated which is so attached to the body of the utensil that flexing or distortion of the wall of the body, adjacent the point of attachment of the handle to the body, will not result from the pressure on the butt of the handle resulting when the utensil is being used or handled. Thus, if the utensil is of the enameled type, no cracking of the enamel will result.

In its preferred form, I provide a metal stub handle which instead of being welded or otherwise attached only to the side wall of the metal body of the utensil, is welded to the reinforcing peripheral bead provided on the upper edge of the utensil and to the adjacent side wall of the body. The butt end or inner end of the stub is so formed that it embraces the bead and engages the side wall directly below the bead. This results in a very rigid structure.

The preferred embodiment of my invention is illustrated in the accompanying drawings wherein similar characters of reference designate corresponding parts and wherein.

Figure 1:
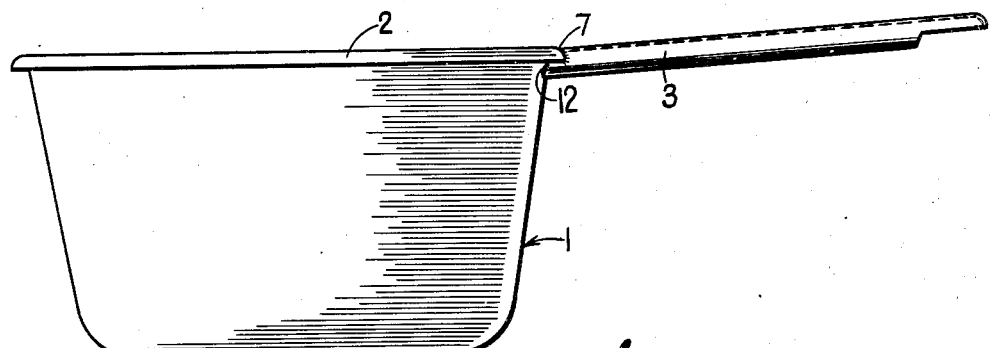
Figure 1 is a side elevational view of a cooking utensil having my handle associated therewith.
Figure 2:
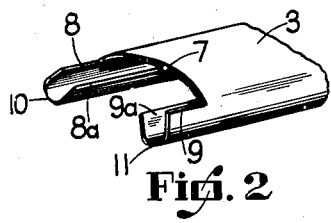
Figure 2 is a perspective view of the inner end of the handle before it is attached to the utensil body.
Figure 3:
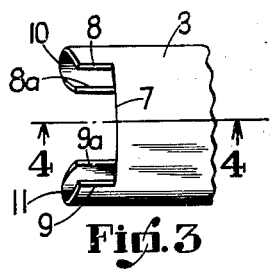
Figure 3 is a plan view of the structure shown in Figure 2.
Figure 5:
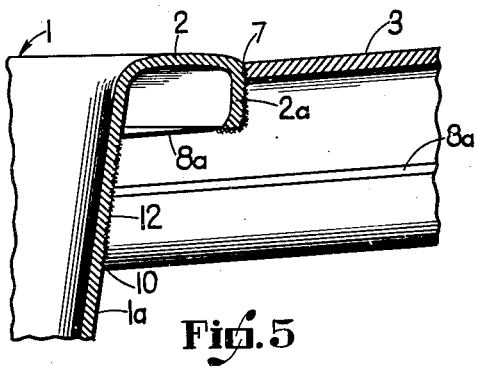
Figure 5 is a detail in vertical section illustrating how the inner end of the handle is associated with and attached to the utensil body.

With reference to the drawing, I have illustrated in Figure 1, one example of a cooking utensil or pan which has my handle structure associated therewith. The body 1 of the pan is formed in the usual manner from a suitable metal, such as steel. The upper end of the body has formed in the usual manner an integral peripheral reinforcing bead 2. However, this bead 2 is preferably relatively flat so that it extends outwardly a substantial distance, as shown in Figure 5, and has a relatively straight vertically disposed outer wall or lip 2a. It will be understood that the bead functions in the usual manner to reinforce the relatively light side wall 1a of the body 1, espectially adjacent the bead 2.

Figure 4:
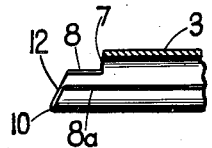
Figure 4 is a sectional view, taken along line 4—4 of Figure 3.
Figure 6:
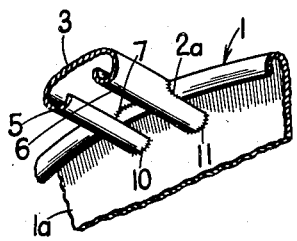
Figure 6 is a perspective view looking beneath the handle adjacent its inner end and illustrating how it is attached to the utensil body.
Figure 7:
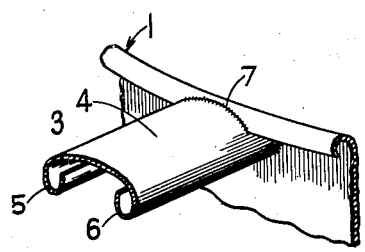
Figure 7 is a similar perspective view, but taken from the top side of the handle adjacent its inner end.

The metal stub handle 3 may be formed in suitable dies and may serve as the complete handle or may have a hand grip (not shown) of heat insulating material applied thereto. As shown best in Figures 6 and 7, the handle 3, which is formed from an elongated strip of metal, comprises a central slightly curved section 4 which has its side edges turned inwardly and upwardly towards each other to form longitudinally extending reinforcing ribs 5 and 6. The inner or butt end of the handle is notched by a suitable die cutting operation so as to remove a portion of the central section 4 of the handle 3 along a slightly curved transverse line 7 extending almost the full width of the handle but terminating at the edges 8 and 9 which are in alignment, substantially, with the edges 8a and 9a of the ribs 5 and 6. Thus, the inner end of the handle is so notched that the outwardly projecting attaching lugs 10 and 11 are formed thereon. As shown in Figure 4, the extreme ends of lugs 10 and 11 may be beveled, as indicated at 12, to the same extent as the side wall of the body 1 to which the handle is to be applied.

In applying the handle to the body, the notched end is positioned on the body, as shown in Figures 1 and 5. The attaching lugs 10 and 11 will extend beneath the reinforcing bead 2 and the beveled edges 12 thereof will contact with the inclined side wall of the body. The slightly curved inner edge 7 of the notch in the handle will contact with the outer wall or lip 2a of the bead 2. The curvature of edge 7 will correspond to that of the circumferentially extending wall 2a. The edges 8 and 9 will contact with the lower edge of the wall or lip 2a. All of the contacting points or edges between the handle and the body are now suitably welded. Thus, the handle is welded to the reinforcing bead 2 and also to the rigid part of the side wall 1a directly below the reinforcing bead.

It will be apparent that the handle is attached to the body in such a manner that a strong, rugged joint is formed and there will be no danger of the handle separating from the body even after long continued and severe use of the utensil. The handle is attached to the strong bead and the adjacent strong side wall of the body and, therefore, there will be no danger of distortion of the body adjacent its point of connection to the handle. Consequently, if the utensil is coated with enamel, there will be no danger of cracking the enamel which is very undesirable, especially if the enamel on the interior surface of the utensil is cracked.

Various other advantages will be apparent.

Having thus described my invention, what I claim is:

1. In combination, a utensil comprising a hollow body portion made of metal, said body portion having an outwardly projecting reinforcing bead on its edge, a metal handle welded to the body portion, said metal handle having its inner end notched so as to form an attaching edge which fits around and engages the outer part of said bead and laterally spaced substantially horizontal lugs which project beneath the bead and engage the side wall of the body portion, said engaging portions of said handle and body portion being welded together.

2. In combination, a utensil comprising a hollow body portion made of metal, said body portion having an outwardly projecting reinforcing bead on its edge, a metal handle welded to the body portion, said metal handle being of elongated form and having reinforcing ribs formed on its side edges, said metal handle having its inner end notched so as to eliminate a section of metal between said ribs and thereby forming projecting laterally spaced substantially horizontal lugs from portions of said ribs, said lugs being positioned beneath said bead with their extremities in contact with the side wall of the body and with their upper edges in contact with the lower edge of the bead, the edge formed at the inner side of the notch in the handle engaging the outer surface of said bead, said last-named edge being welded to the bead, said upper edges of the lugs being welded to the bead and said extremities of the lugs being welded to the side wall of the body.

3. The combination set forth in claim 2 wherein the body is curved in horizontal cross-section and the reinforcing bead is similarly curved and wherein said edge of the handle formed at the inner end of the notch is similarly curved.

4. The combination set forth in claim 2 wherein the side wall of the body is inclined and wherein the extremities of said lugs are corerspondingly beveled.

5. The combination set forth in claim 2 wherein the side wall of the body is inclined, the body is curved in horizontal cross-section and the reinforcing bead is similarly curved and wherein said extremities of said lugs are inclined to fit the inclined body portion and said edge of the handle formed at the inner end of the notch is curved to fit the curvature of the bead.

WALTER B. MOORE.

REFERENCES CITED

The following references are of record in the file of this patent:

UNITED STATES PATENTS

| Number | Name | Date |
|---|---|---|
| 137,848 | Lamb | Apr. 15, 1873 |
| 2,011,752 | Christman | Aug. 20, 1935 |

FOREIGN PATENTS

| Number | Country | Date |
|---|---|---|
| 290,764 | Great Britain | May 24, 1938 |